(12) United States Patent
Chou et al.

(10) Patent No.: US 8,481,211 B2
(45) Date of Patent: Jul. 9, 2013

(54) FERROUS PHOSPHATE (II) POWDERS, LITHIUM IRON PHOSPHATE POWDERS FOR LI-ION BATTERY, AND METHODS FOR MANUFACTURING THE SAME

(75) Inventors: Lih-Hsin Chou, Hsinchu (TW); Kuei-Chao Wu, Hsinchu (TW)

(73) Assignees: National Tsing Hua University, Hsinchu (TW); Torchlight Technology Co., Ltd., Chung-Li, Taoyuan County (TW)

( * ) Notice: Subject to any disclaimer, the term of this patent is extended or adjusted under 35 U.S.C. 154(b) by 0 days.

(21) Appl. No.: 13/524,287

(22) Filed: Jun. 15, 2012

(65) Prior Publication Data

US 2012/0321958 A1 Dec. 20, 2012

(51) Int. Cl.
*H01M 4/13* (2010.01)
(52) U.S. Cl.
USPC .................. 429/221; 429/218.1; 423/306
(58) Field of Classification Search
None
See application file for complete search history.

(56) References Cited

U.S. PATENT DOCUMENTS

| | | | | |
|---|---|---|---|---|
| 5,982,073 | A * | 11/1999 | Lashmore et al. | 310/216.001 |
| 7,285,260 | B2 * | 10/2007 | Armand et al. | 423/306 |
| 7,781,100 | B2 * | 8/2010 | Liu et al. | 429/218.1 |
| 7,807,121 | B2 * | 10/2010 | Nuspl et al. | 423/306 |
| 2011/0068295 | A1 * | 3/2011 | Beck et al. | 252/182.1 |

OTHER PUBLICATIONS

Liu et al., In situ immovilization of Cu(II) in soils using a new class of iron phosphate nanoparticles, Chemosphere 68 (2207) 1867-1876.*

Thinnappan et al., A combined experimental study of vivianite and As(V) reactivity in the pH range 2-11, Applied Geochemistry 23 (2008) 3187-3204.*

Franger et al., Comparison between diifferent LiFePO4 synthesis routes and their influence on its physical-chemical properties, Journal of Power Sources 119-121 (2003), pp. 252-257.*

Satyabrata et al., Size-Controlled Synthesis of Magnetite Nanoparticles in the Presence of Polyelectrolytes, Chem. Mater, 2004, 16, 3489-3496.*

The Dictionary of Geology and Mineralogy, 2nd Edition, McGraw Hill, 2003.*

Mattievich et al., Hydrothermal Synthesis and Mossbauer Studies of Ferrous Phosphates of the Homologous Series Fe(3)2+(PO4)2(H2O)n.*

Jinling Song, Ying Chu, Yang Liu, Lili Li and Wendong Sun, Room-temperature controllable fabrication of silver nanoplates reduced by aniline, Chemical Communications, 2008, p. 1223-1225, Iss.10, The Royal Society of Chemistry, UK.

Na Tian, Zhi-You Zhou and Shi-Gang Sun, Electrochemical preparation of Pd nanorods with high-index facets,Chemical Communications, 2009, p. 1502-1504, Iss.12, The Royal Society of Chemistry, UK.

(Continued)

*Primary Examiner* — Patrick Ryan
*Assistant Examiner* — Jose Colucci Rios
(74) *Attorney, Agent, or Firm* — Muncy, Geissler, Olds & Lowe, PLLC

(57) ABSTRACT

Ferrous phosphate (II) ($Fe_3(PO_4)_2$) powders, lithium iron phosphate ($LiFePO_4$) powders for a Li-ion battery and methods for manufacturing the same are provided. The ferrous phosphate (II) powders are represented by the following formula (I):

$$Fe_{(3-x)}M_x(PO_4)_2 \cdot yH_2O \qquad (I)$$

wherein, M, x, and y are defined in the specification, the ferrous phosphate (II) powders are composed of plural flake powders, and the length of each of the flake powders is 0.5-10 μm.

6 Claims, 10 Drawing Sheets

OTHER PUBLICATIONS

Young Wook Lee, Minjung Kim and Sang Woo Han, Shaping Pd nanocatalysts through the control of reaction sequence, Chemical Communications, 2010, p. 1535-1537, Iss.9, The Royal Society of Chemistry, UK.

Xueai Li, Bin Zhang, Chunhua Ju, Xijiang Han, Yuchen Du and Ping Xu, Morphology-Controlled Synthesis and Electromagnetic Properties of Porous Fe3O4 Nanostructures from Iron Alkoxide Precursors, The Journal of Physical Chemistry, 2011, p. 12350-12357, American Chemical Society.

Li Wang, Xiangming He, Wenting Sun, Jianlong Wang, Yadong Li and Shoushan Fan, Crystal Orientation Tuning of LiFePO4 Nanoplates for High Rate Lithium Battery Cathode Materials, Nano Letters, 2012, p. 5632-5636, American Chemical Society.

* cited by examiner

FERROUS PHOSPHATE (II) POWDERS, LITHIUM IRON PHOSPHATE POWDERS FOR LI-ION BATTERY, AND METHODS FOR MANUFACTURING THE SAME

CROSS REFERENCE TO RELATED APPLICATION

This application claims the benefits of the Taiwan Patent Application Serial Number 100121234, filed on Jun. 17, 2011, the subject matter of which is incorporated herein by reference.

BACKGROUND OF THE INVENTION

1. Field of the Invention

The present invention relates to ferrous phosphate (II) powders, lithium iron phosphate powders prepared therefrom, and methods for manufacturing the same. More specifically, the present invention relates to ferrous phosphate powders for preparing Li-ion batteries with reduced cost, lithium iron phosphate powders prepared therefrom, and methods for manufacturing the same.

2. Description of Related Art

As the development of various portable electronic devices continues, more and more attention focuses on the techniques of energy storage, and batteries are the main power supplies for these portable electronic devices. Among commercial batteries, small-sized secondary batteries are especially the major power supplies for portable electronic devices such as cell phones and notebooks. In addition, secondary batteries are applied to not only portable electronic devices, but also electric vehicles.

Among the developed secondary batteries, the lithium secondary batteries (also named as the Li-ion batteries) developed in 1990 are the most popular batteries used nowadays. The cathode material of the initial lithium secondary batteries is $LiCoO_2$. $LiCoO_2$ has the properties of high working voltage and stable charging and discharging voltage, so the secondary batteries which use $LiCoO_2$ as a cathode material are widely applied to portable electronic devices. Then, $LiFePO_4$ with an olivine structure and $LiMn_2O_4$ with a spinal structure were also developed as a cathode material for lithium secondary batteries. Compared to $LiCoO_2$, the safety of the batteries can be improved, the charge/discharge cycles can be increased, and the cost can be further reduced when LiFePO4 or $LiMn_2O_4$ is used as cathode material of secondary batteries.

Although the batteries which use $LiMn_2O_4$ as cathode materials have low cost and improved safety, the spinal structure of $LiMn_2O_4$ may collapse during the deep discharge process, due to Jahn-Teller effect. In this case, the cycle performance of the batteries may further be decreased. When $LiFePO_4$ is used as cathode material of batteries, the batteries also have the properties of low cost and improved safety. In addition, the capacity of $LiFePO_4$ is higher than that of $LiMn_2O_4$, so the batteries made from $LiFePO_4$ can further be applied to devices which need large current and high power. Furthermore, LiFePO4 is a non-toxic and environmentally friendly material, and also has great high temperature characteristics. Hence, $LiFePO_4$ is considered as an excellent cathode material for lithium batteries. Currently, the average discharge voltage of the lithium batteries using $LiFePO_4$ as a cathode material is 3.4~3.7 V vs. $Li^+/Li$.

A conventional structure of the Li-ion batteries comprises: a cathode, an anode, a separator, and a Li-containing electrolyte. The batteries perform the charge/discharge cycles by the lithium insertion and extraction mechanism, which is represented by the following equations (I) and (II).

$$\text{Charge: } LiFePO_4 - xLi^+ - xe^- \rightarrow xFePO_4 + (1-x)LiFePO_4 \quad (I)$$

$$\text{Discharge: } FePO_4 + xLi^+ + xe^- \rightarrow xLiFePO_4 + (1-x)FePO_4 \quad (II)$$

When a charge process of the batteries is performed, Li ions extract from the structure of $LiFePO_4$; and the Li ions insert into the structure of $FePO_4$ when a discharge process is performed. Hence, the charge/discharge process of the Li-ion batteries is a two-phase process of $LiFePO_4/FePO_4$.

Currently, the $LiFePO_4$ powders are usually prepared by a solid-state process. However, the property of the product is highly related to the sintering temperature of the solid-state process. When the sintering temperature is below 700° C., all the raw materials have to be mixed well. If the raw materials are not mixed well, $Fe^{3+}$ impurity phase will be present in the $LiFePO_4$ powders. When sintering temperature is below 600° C., the average grain size of the $LiFePO_4$ powders will be smaller than 30 μm. However, if the sintering temperature is increased, the average grain size of the $LiFePO_4$ powders will be larger than 30 μm. When the average grain size of the $LiFePO_4$ powders is larger than 30 μm, a grinding process and a sieving process have to be performed to obtain powders with specific grain size between 1 μm to 10 μm, in order to be used for preparing Li-ion batteries. Hence, in the case that the $LiFePO_4$ powders are prepared through a solid-state process, the grinding process and the sieving process have to be performed, which may increase the cost of the Li-ion batteries. In addition, the problem of large and non-uniform grain size of the $LiFePO_4$ powders may also occur.

Therefore, it is desirable to provide a method for manufacturing micro-sized, submicro-sized, even nano-sized cathode materials of Li-ion batteries in a simple way, in order to increase the charge/discharge efficiency of the batteries and reduce the cost thereof.

SUMMARY OF THE INVENTION

The object of the present invention is to provide ferrous phosphate (II) powders for manufacturing a cathode material of a Li-ion battery, which have nano, micro, or sub-micro grain size and can be applied to the current process for preparing lithium iron phosphate powders.

Another object of the present invention is to provide a method for manufacturing ferrous phosphate (II) powders for cathode materials of Li-ion batteries. Ferrous phosphate (II) powders with nano, micro or sub-micro grain sized can be prepared through this method of the present invention, in order to prepare lithium iron phosphate powders for Li-ion batteries.

A further object of the present invention is to provide lithium iron phosphate powders for use in Li-ion batteries, in order to improve the charge/discharge efficiency of the Li-ion batteries.

A further object of the present invention is to provide a method for manufacturing lithium iron phosphate powders for use in Li-ion batteries. The sintered powders have uniform and small grain size in nano, micro, or sub-micro scale, so the grinding process and the sieving process can be omitted. Hence, the cost of the Li-ion batteries can be further reduced.

To achieve the object, the method for manufacturing ferrous phosphate (II) powders of the present invention comprises the following steps: (A) providing a P-containing precursor solution, wherein the P-containing precursor solution comprises: a P-containing precursor, and a weakly alkaline compound; and (B) adding a ferrous compound into the P-containing precursor solution to obtain ferrous phosphate (II) powders.

In addition, the present invention also provides ferrous phosphate (II) powders, which are prepared through the aforementioned method, to apply to prepare cathode materials for Li-ion batteries. The ferrous phosphate (II) powders for manufacturing cathode materials of Li-ion batteries according to the present invention are represented by the following formula (I):

$$Fe_{(3-x)}M_x(PO_4)_2 \cdot yH_2O \quad (I)$$

wherein M comprises at least one metal selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb, $0 \leq x < 1.5$, y is an intergral of 0 to 8, the ferrous phosphate (II) powders are composed of plural flake powders, and the length of each of the flake powders is 0.5-10 µm. Preferably, the flake powders are powders composed of independent flakes, flake powders that one end of each of the flake powders connects to each other, flake powders connecting to each other at the center of the flakes, or flake powders that one end of each of the flake powders connects to each other to form a connecting center. More preferably, one end of each of the flake powders connects to each other to form a connecting center.

In addition, the present invention also provides a method for manufacturing lithium iron phosphate powders for a Li-ion battery, wherein the aforementioned ferrous phosphate (II) powders are used as Fe-containing precursors. The method for manufacturing lithium iron phosphate powders of the present invention comprises the following steps: (a) providing the aforementioned ferrous phosphate (II) powders; (b) mixing the ferrous phosphate (II) powders with a Li-containing precursor to obtain mixed powders; and (c) heat-treating the mixed powders to obtain lithium iron phosphate powders.

When the aforementioned method for manufacturing lithium iron phosphate powders of the present invention is applied, the obtained lithium iron phosphate powders of the present invention are represented by the following formula (II):

$$LiFe_{(1-a)}M_aPO_4 \quad (II)$$

wherein M comprises at least one metal selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb, $0 \leq a < 0.5$, the lithium iron phosphate powders are composed of plural flake powders, and the length of each of the flake powders is 0.5-10 p.m. Preferably, the flake powders are powders composed of independent flakes, flake powders that one end of each of the flake powders connects to each other, flake powders connecting to each other at the center of the flakes, or flake powders that one end of each of the flake powders connects to each other to form a connecting center. More preferably, one end of each of the flake powders connects to each other to form a connecting center.

The ferrous phosphate (II) powders for manufacturing cathode materials of Li-ion batteries of the present invention have uniform and small grain size in nano, micro, or sub-micro scale. However, the grain size of the conventional ferrous phosphate (II) powders or the conventional ferrous phosphate precursors is large and non-uniform, so the sintering process (i.e. the heat-treating process) has to be performed for at least ten hours, in order to completely transform the ferrous phosphate (II) powders or the ferrous phosphate precursors into lithium iron phosphate. In addition, the grain size of the sintered powders is usually large, so a grinding process and a sieving process have to be performed to obtain powders with specific grain size between 1 µm to 10 µm. However, the ferrous phosphate (II) powders of the present invention have uniform and small size, and specific shapes. Hence, the ferrous phosphate (II) powders can be completely transformed into lithium iron phosphate within three hours, so the time for the sintering process can be greatly reduced. In addition, the obtained lithium iron phosphate powders still have the size and the shape of the ferrous phosphate (II) powders after the sintering process, so the cathode materials of the Li-ion batteries can be obtained without performing the grinding process and the sieving process. Hence, when the ferrous phosphate (II) powders of the present invention are used to prepare lithium iron phosphate powders, the time for the sintering process can be reduced, and the grinding process and the sieving process can be omitted. Therefore, the cost for manufacturing the Li-ion batteries can be further reduced. In addition, the ferrous phosphate (II) powders of the present invention can be directly applied to the current production lines of lithium iron phosphate powders, so it is unnecessary to build new production lines for manufacturing lithium iron phosphate powders by use of the ferrous phosphate (II) powders of the present invention. Therefore, the cost for manufacturing the Li-ion batteries can be further reduced.

According to the method for manufacturing ferrous phosphate (II) powders of the present invention, at least one metal-containing compound may further be added into the P-containing precursor solution to obtain the doped ferrous phosphate (II) powders in step (B), and the doped metal in the obtained ferrous phosphate (II) powders can increase the conductivity of the sequentially obtained lithium iron phosphate powders. Herein, the molar ratio of the metal-containing compound to the ferrous compound may be 1:1 to 1:999, i.e. the molar content of the metal-containing compound is 0.1-50% of that of the ferrous phosphate (II) powders. Preferably, the molar ratio of the metal-containing compound to the ferrous compound is 1:4 to 1:99, i.e. the molar content of the metal-containing compound is 1-20% of that of the ferrous phosphate (II) powders. In addition, the metal-containing compound can be any metal salt containing a doped metal of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, or Nb. Preferably, the metal-containing compounds are sulfates, carbonates, nitrates, oxalates, acetates, chlorites, bromides, or iodides of the aforementioned doped metals. More preferably, the metal-containing compounds are sulfates of the aforementioned doped metals. Most preferably, the metal-containing compounds are sulfates of Mn, Cr, Co, Cu, Ni, Zn, Al, or Mg.

The method for manufacturing ferrous phosphate (II) powders of the present invention may further comprise a step (B1) after the step (B): washing the ferrous phosphate (II) powders. Herein, the ferrous phosphate (II) powders can be washed with ethanol, water, or a combination thereof. Preferably, the ferrous phosphate (II) powders are washed with an ethanol solution, wherein the volume ratio of the ethanol to water is 1:1. In addition, the method for manufacturing ferrous phosphate (II) powders of the present invention may further comprise a step (B2) after the step (B1): drying the obtained ferrous phosphate (II) powders. As the temperature of the drying process is increased, the time thereof can be reduced. Preferably, the ferrous phosphate (II) powders are dried at 40-120° C. for 5-20 hours. More preferably, the ferrous phosphate (II) powders are dried at 50-70° C. for 7-15 hours.

Hence, according to the ferrous phosphate (II) powders and the lithium iron, phosphate powders of the present invention, M in the formula (I) and formula (II) respectively comprises at least one metal, which is preferably selected from the group consisting of Mn, Cr, Co, Cu, Ni, Zn, Al, and Mg. More preferably, the metal is selected from the group consisting of Mn, Cu, Zn, Al, Ni, and Mg. In addition, preferably $0 \leq x < 0.5$ in formula (I). Furthermore, preferably $0 \leq a < 0.15$ in formula (II).

According to the ferrous phosphate (II) powders and the lithium iron phosphate powders of the present invention, the length of each of the flake powders preferably is 0.5-5 μm. More preferably, the length of each of the flake powders is 0.5-2 μm. In addition, the lithium iron phosphate powders of the present invention have olivine structures.

According to the methods for manufacturing the ferrous phosphate (II) powders and the lithium iron phosphate powders of the present invention, the P-containing precursor can be at least one selected from the group consisting of $H_3PO_4$, $NaH_2PO_4$, $Na_2HPO_4$, $Mg_3(PO_4)_2$, and $NH_3H_2PO_4$. Preferably, the P-containing precursor is $H_3PO_4$, $NH_3H_2PO_4$, or a combination thereof.

In addition, according to the methods for manufacturing the ferrous phosphate (II) powders and the lithium iron phosphate powders of the present invention, the weakly alkaline compound may be at least one selected from the group consisting of $Na_2CO_3$, and $NaHCO_3$. Preferably, the weakly alkaline compound is $NaHCO_3$.

Furthermore, according to the methods for manufacturing the ferrous phosphate (II) powders and the lithium iron phosphate powders of the present invention, the ferrous compound may be at least one selected from the group consisting of $FeCl_2$, $FeBr_2$, $FeI_2$, $FeSO_4$, $(NH_4)_2Fe(SO_4)_2$, $Fe(NO_3)_2$, $FeC_2O_4$, $(CH_3COO)_2Fe$, and $FeCO_3$. Preferably, the ferrous compound is $FeCl_2$, $FeSO_4$, $(NH_4)_2Fe(SO_4)_2$, $FeCO_3$, or a combination thereof. More preferably, the ferrous compound is $FeSO_4$.

According to the methods for manufacturing the lithium iron phosphate powders of the present invention, the Li-containing precursor may be at least one selected from the group consisting of LiOH, $Li_2CO_3$, $LiNO_3$, $CH_3COOLi$, $Li_2C_2O_4$, $Li_2SO_4$, LiCl, LiBr, LiI, $LiH_2PO_4$, $Li_2HPO_4$, and $Li_3PO_4$. Preferably, the Li-containing precursor is LiOH, $Li_2SO_4$, $LiH_2PO_4$, or $Li_3PO_4$. More preferably, the Li-containing precursor is $Li_3PO_4$.

In addition, according to the methods for manufacturing the lithium iron phosphate powders of the present invention, the ferrous phosphate (II) powders are mixed with the Li-containing precursor and a carbon-containing material to obtain mixed powders in step (b). In this case, the surfaces of the obtained lithium iron phosphate powders are coated with carbon, so the conductivity of the obtained lithium iron phosphate powders can further be increased. In addition, the carbon-containing material can also inhibit the growth of the lithium iron phosphate powders, so the size of the lithium iron phosphate powders can be kept small. Herein, the carbon-containing material can be any sugar such as sucrose, and also be vitamin C (L-ascorbate). In addition, the additional amount of the carbon-containing material can be 0.1-20 wt % of the weight of the obtained lithium iron phosphate powders. Preferably, the additional amount of the carbon-containing material is 5-15 wt % of the weight of the obtained lithium iron phosphate powders.

According to the methods for manufacturing the lithium iron phosphate powders of the present invention, the mixed powders can be heat-treated under an atmosphere or with an introduced gas flow to obtain the lithium iron phosphate powders, in step (c). Herein, the atmosphere or the introduced gas flow can be used as a protection gas or a reduction gas, which may comprise at least one selected from the group consisting of $N_2$, $H_2$, He, Ne, Ar, Kr, Xe, CO, methane, $N_2$—$H_2$ mixed gas, and a mixture thereof. Preferably, the protection gas or the reduction gas is $N_2$, $H_2$, or $N_2$—$H_2$ mixed gas. More preferably, the protection gas or the reduction gas is $N_2$—$H_2$ mixed gas.

In addition, according to the methods for manufacturing the lithium iron phosphate powders of the present invention, the mixed powders are heat-treated at 300-800° C., preferably. In addition, the mixed powders are preferably heat-treated for 1-20 hours. More preferably, the mixed powders are heat-treated at 500-750° C. for 1-5 hours.

In addition, the obtained lithium iron phosphate powders of the present invention can be used as cathode materials to prepare Li-ion batteries, through any conventional method in the art. Here, the method for manufacturing the Li-ion batteries is simply described, but the present invention is not limited thereto.

An anode current collector is coated with a carbon material, and then the carbon material is dried and pressed to form an anode for the Li-ion battery. A cathode current collector is coated with a cathode active material (i.e. the lithium iron phosphate powders of the present invention), and then the cathode active material is dried and pressed to form a cathode for the Li-ion battery. Next, a separator is inserted between the cathode and the anode, a Li-containing electrolyte is injected, and a Li-ion battery is obtained after an assembling process.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Embodiment 1

$H_3PO_4$ and $NaHCO_3$ were mixed in a molar ratio of 1:3, and dissolved in de-ionized water (500 ml) to obtain a P-containing precursor solution. After the P-containing precursor solution was stirred for 30 mins, ferrous sulfate hydrate ($FeSO_4 \cdot 8H_2O$) was added into the P-containing precursor solution, wherein the molar ratio of $FeSO_4 \cdot 8H_2O$ to $H_3PO_4$ was 3:2. After the reaction was completed, the product was washed with an ethanol solution, and then collected with centrifugation for twice. After the collected product was dried at 60° C. for 12 hours, ferrous phosphate (II) precursor powders ($Fe_3(PO_4)_2 \cdot 8H_2O$) were obtained.

Figure 1A:
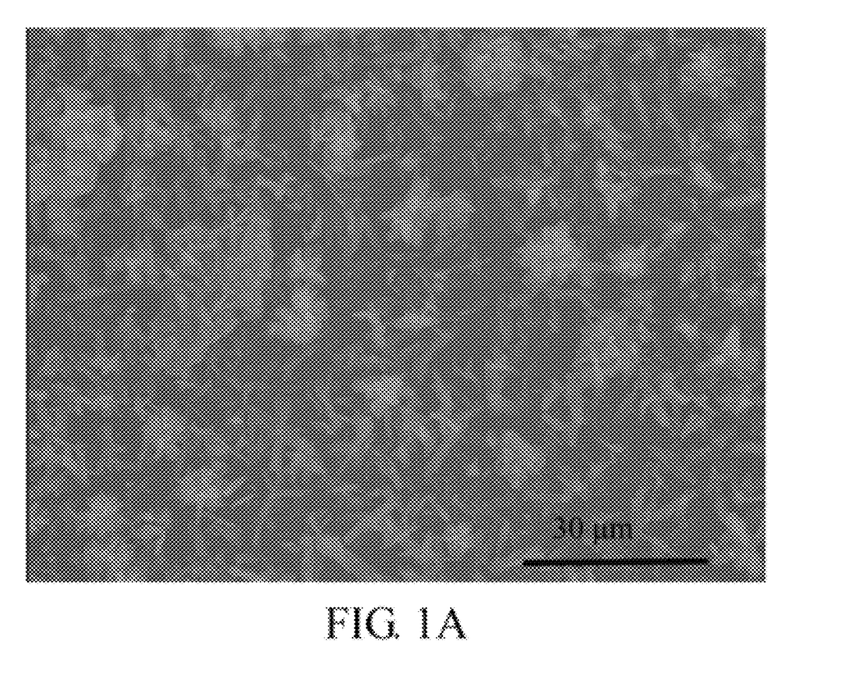
FIGS. 1A-1D are SEM photos of ferrous phosphate (II) powders according to Embodiment 1 of the present invention.
Figure 1B:
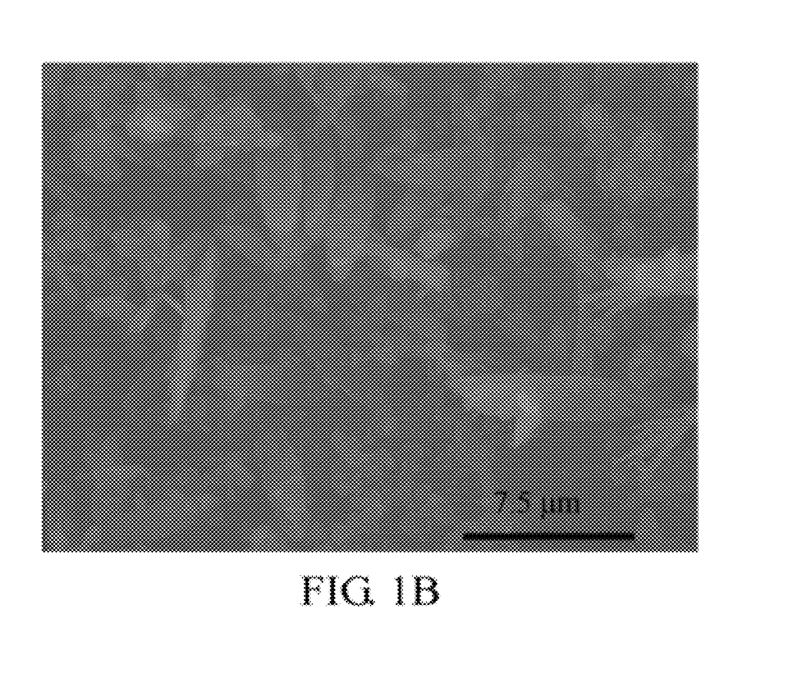
Figure 1C:
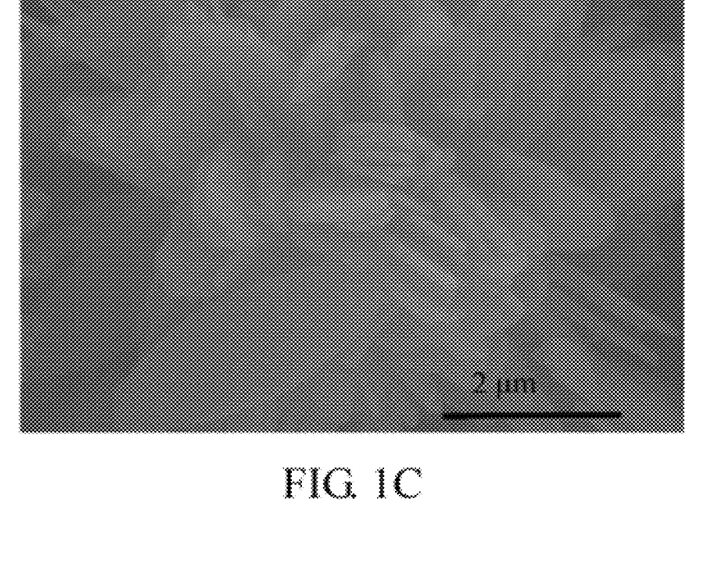
Figure 1D:
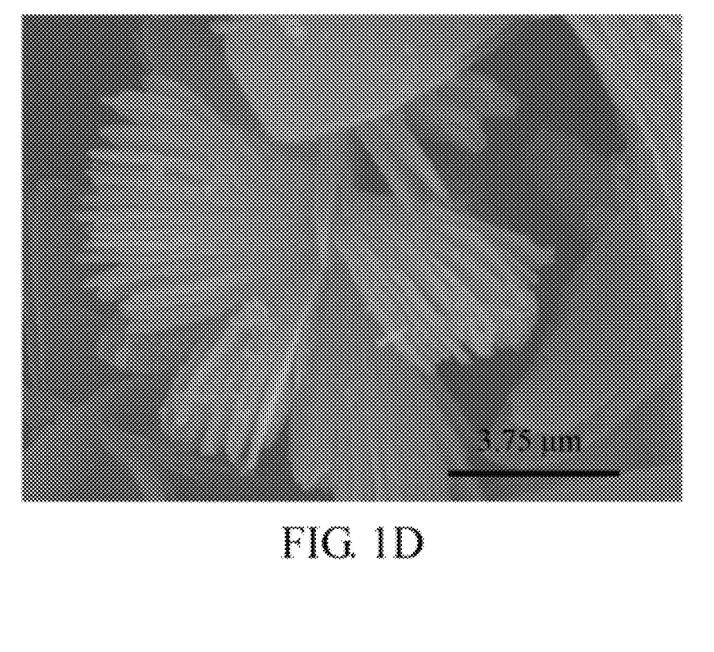

The shapes of the ferrous phosphate (II) powders of the present embodiment were observed with a scanning electron microscope (SEM) (Hitachi S-4000), and the results are shown in FIGS. 1A-1D. As shown in FIG. 1A, the ferrous phosphate (II) powders have flat shapes in macro view, when the ferrous phosphate (II) powders were observed at the magnification of 10000×. When the ferrous phosphate (II) powders were observed at the magnification of 100000×, parts of the ferrous phosphate (II) powders are formed in independent flakes, as shown in FIG. 1B. In addition, flake powders in which one end of each of the flake powders connects to each other to form a connecting center are also observed, as shown in FIG. 1C. Furthermore, flake powders connecting to each other at the center thereof are also observed, as shown in FIG. 1D. Among the observed powders, most of the powders are flake powders that one end of each of the flake powders connects to each other to form a connecting center; the powders formed in independent flakes are secondly observed; and only few powders are flake powders connecting to each other at the center thereof. Furthermore, among the observed ferrous phosphate (II) powders, the length of each of the flake powders is about 2 μm.

Figure 2:
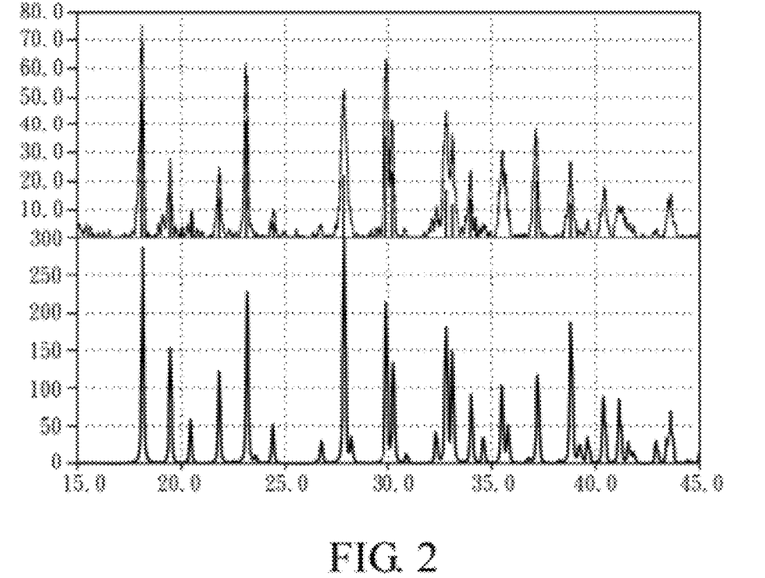
FIG. 2 is an XRD diffraction pattern of ferrous phosphate (II) powders according to Embodiment 1 of the present invention.

In addition, the obtained ferrous phosphate (II) powders of the present embodiment were also examined with an X-ray diffraction microscope (Shimadzu 6000) to obtain the crystal structure thereof. The X-ray diffraction pattern was collected by Cu Kα radiation, the 2θ-scanning angle is 15°-45°, and the scanning rate is 1°/min. The obtained XRD diffraction pattern is shown in FIG. 2, wherein the upper figure is the XRD diffraction pattern of ferrous phosphate (II) powders of the present embodiment, the lower figure is the XRD diffraction pattern of ferrous phosphate (II) powders ($Fe_3(PO_4)_2 \cdot 8H_2O$) (JCPDS No. 83-2453), and lines in the upper figure are used to indicate the position of the peaks. As shown in FIG. 2, the lines indicating the peaks of the ferrous phosphate (II) powders of the present embodiment correspond to the peaks of ferrous phosphate (II) powders ($Fe_3(PO_4)_2 \cdot 8H_2O$) (JCPDS No. 83-2453), and there are no other peaks observed in ferrous phosphate (II) powders of the present embodiment. This result indicates that all the ferrous phosphate (II) powders prepared according to the present embodiment are indeed ferrous phosphate (II) powders.

Next, the ferrous phosphate (II) powders of the present embodiment was used as a precursor, and mixed with $Li_3PO_4$ in a molar ratio of 1:1. In addition, 15 wt % of sugar was also added in the mixture. The mixture was mixed with a 3D shaker for 2 hrs to obtain mixed powders. Then, the mixed powders were heat-treated at 750° C., under an atmosphere of $N_2$ gas for 3 hrs. Finally, $LiFePO_4$ powders coated with carbon and which were formed in flake shapes, were obtained.

Figure 3:
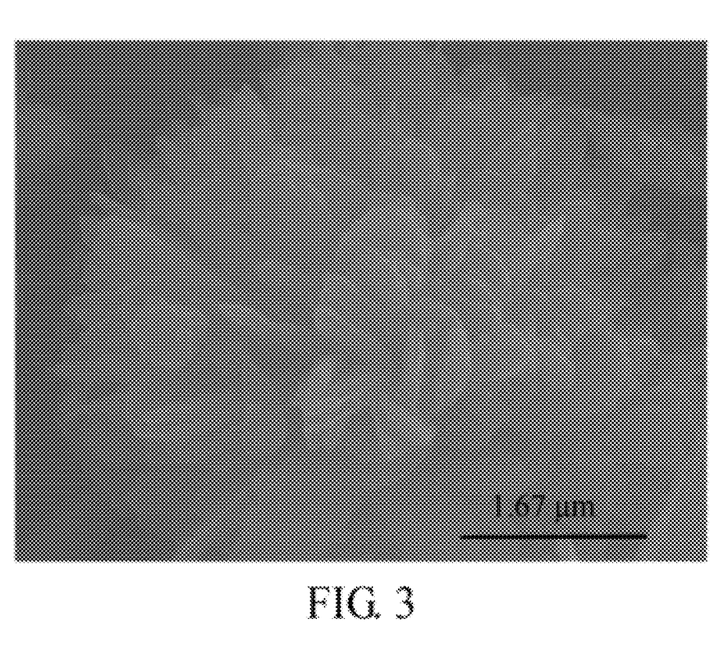
FIG. 3 is a SEM photo of lithium iron phosphate powders according to Embodiment 1 of the present invention.

The shapes of the $LiFePO_4$ powders of the present embodiment were observed with a scanning electron microscope (SEM) (Hitachi S-4000). When the $LiFePO_4$ powders were observed at the magnification of 100000×, the sintered $LiFePO_4$ powders still have similar shape after the heat-treating process to that of the original ferrous phosphate (II) powders. Herein, most of the powders are flake powders that one end of each of the flake powders connects to each other to form a connecting center, and the length of each of the flake powders is about 2 μm, as shown in FIG. 3. In addition, even though the time for performing the heat-treating process is short, all the ferrous phosphate (II) powders can be transformed into $LiFePO_4$, due to the uniform and small grain size of the ferrous phosphate (II) powders.

Furthermore, the obtained $LiFePO_4$ powders of the present embodiment were also examined with an X-ray diffraction microscope (Shimadzu 6000) to obtain the crystal structure thereof. The X-ray diffraction pattern was collected by Cu Kα radiation, the 2θ-scanning angle is 15°-45°, and the scanning rate is 1°/min. The obtained XRD diffraction pattern is shown in FIG. 4, wherein the upper figure is the XRD diffraction pattern of $LiFePO_4$ powders of the present embodiment, the lower figures are the XRD diffraction patterns of $LiFePO_4$ crystal with an olivine structure (JCPDS No. 81-1173), and lines in the upper figure are used to indicate the position of the peaks.

Figure 4:
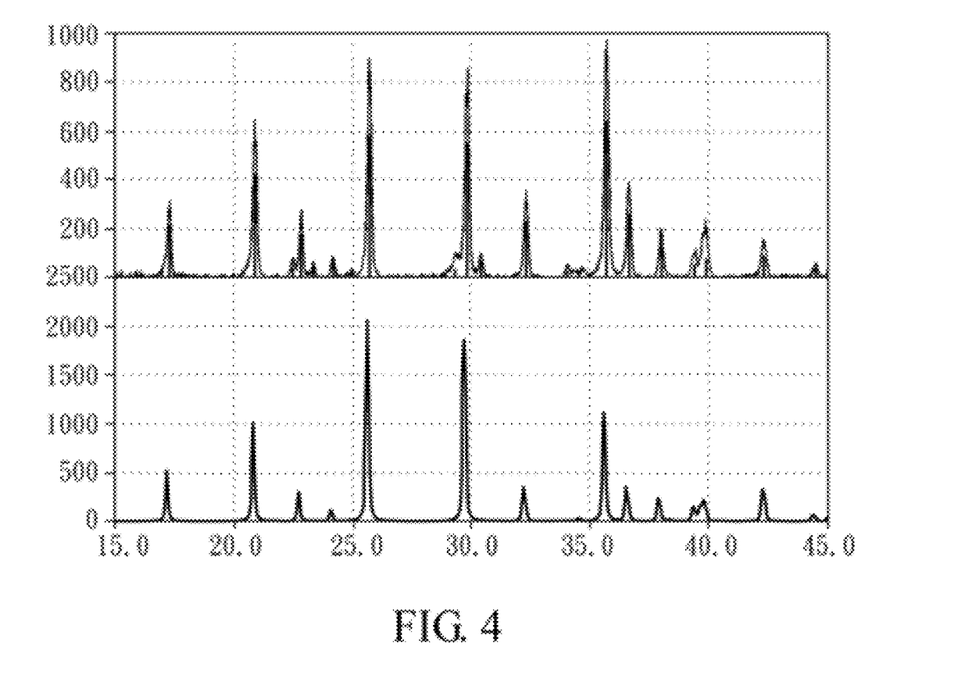
FIG. 4 is an XRD diffraction pattern of lithium iron phosphate powders according to Embodiment 1 of the present invention.

As shown in FIG. 4, all the lines indicating the peaks of the $LiFePO_4$ powders of the present embodiment correspond to the peaks of $LiFePO_4$ crystal with the olivine structure (JCPDS No. 81-1173), and there are no other peaks observed in the $LiFePO_4$ powders of the present embodiment. This result indicates that all the $LiFePO_4$ powders of the present embodiment are $LiFePO_4$ powders with olivine structures.

Embodiment 2

Figure 5:
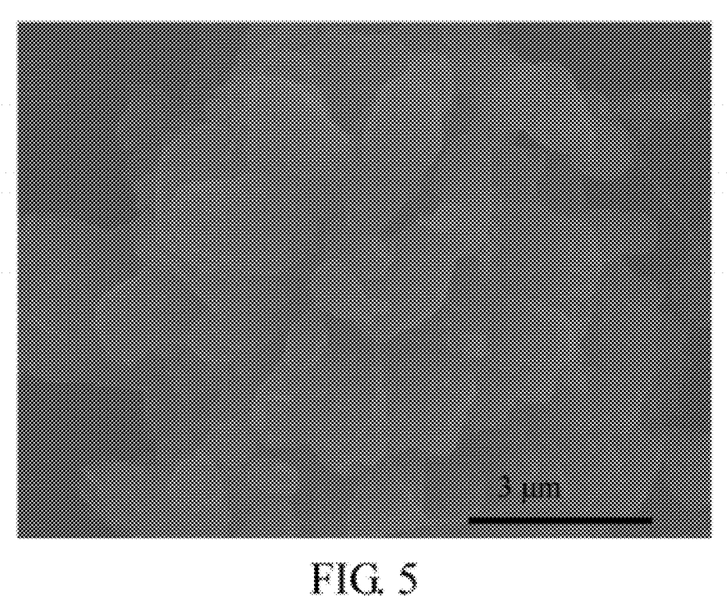
FIG. 5 is a SEM photo of lithium iron phosphate powders according to Embodiment 2 of the present invention.

The $LiFePO_4$ powders of the present embodiment were prepared with the ferrous phosphate (II) powders of Embodiment 1, except only 5 wt % of sugar was added. The shapes of the $LiFePO_4$ powders of the present embodiment were also observed with a scanning electron microscope (SEM) (Hitachi S-4000). The result shows that the $LiFePO_4$ powders of the present embodiment have a similar shape to that of Embodiment 1, and especially most of the powders are flake powders that one end of each of the flake powders connects to each other to form a connecting center, as shown in FIG. 5.

Embodiment 3

Figure 6:
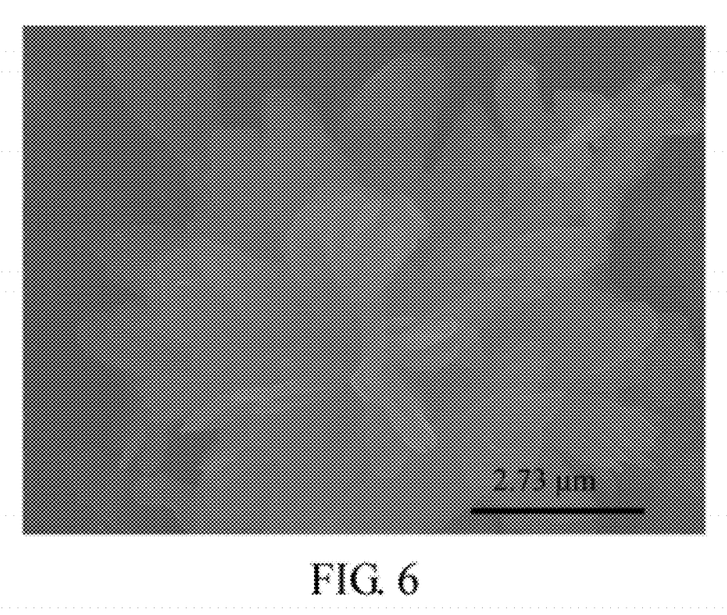
FIG. 6 is a SEM photo of lithium iron phosphate powders according to Embodiment 3 of the present invention.

The $LiFePO_4$ powders of the present embodiment were prepared with the ferrous phosphate (II) powders of Embodiment 1, except only 10 wt % of sugar was added. The shapes of the $LiFePO_4$ powders of the present embodiment were also observed with a scanning electron microscope (SEM) (Hitachi S-4000). The result shows that the $LiFePO_4$ powders of the present embodiment have similar shape to that of Embodiment 1, and especially most of the powders are flake powders that one end of each of the flake powders connects to each other to form a connecting center, as shown in FIG. 6.

Embodiment 4

$H_3PO_4$ and $NaHCO_3$ were mixed in a molar ratio of 1:3, and dissolved in de-ionized water (500 ml) to obtain a P-containing precursor solution. After the P-containing precursor solution was stirred for 30 mins, ferrous sulfate hydrate ($FeSO_4.8H_2O$) and magnesium sulfate hydrate ($MgSO_4.6H_2O$) was added into the P-containing precursor solution, wherein the molar ratio of $FeSO_4.8H_2O$ to $MgSO_4$-$6H_2O$ was 9:1, and the molar ratio of the total amount of $FeSO_4.8H_2O$ and $MgSO_4$-$6H_2O$ to $H_3PO_4$ was 3:2. After the reaction was completed, the product was washed with an ethanol solution, and then collected with centrifugation twice. After the collected product was dried at 60° C. for 12 hours, ferrous phosphate (II) precursor powders doped with Mg ($Fe_{2.7}Mg_{0.3}(PO_4)_2.8H_2O$) were obtained.

Figure 7A:
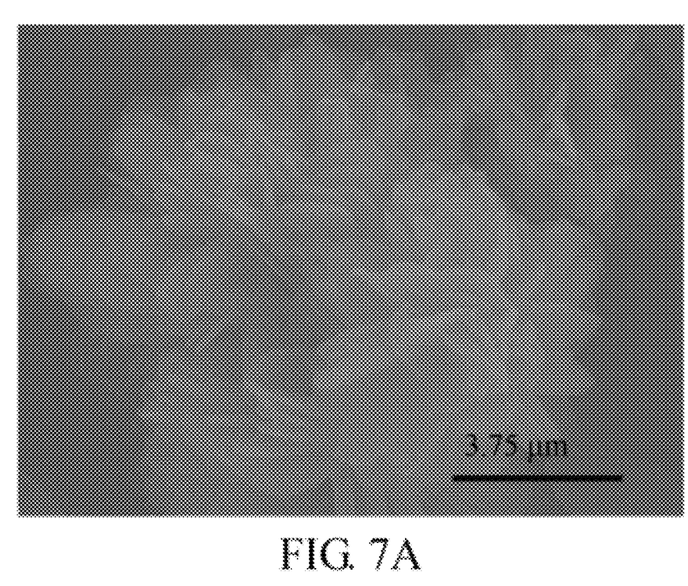
FIG. 7A is a SEM photo of ferrous phosphate (II) powders doped with Mg according to Embodiment 4 of the present invention.

The shapes of the ferrous phosphate (II) precursor powders doped with Mg of the present embodiment were also observed with a scanning electron microscope (SEM) (Hitachi S-4000). When the ferrous phosphate (II) powders doped with Mg were observed at the magnification of 100000×, it was observed that the powders are composed of plural flake powders. More specifically, the powders are powders composed of independent flakes, flake powders that one end of each of the flake powders connects to each other to form a connecting center, or flake powders connecting to each other at the center of the flakes. Herein, most of the powders are flake powders that one end of each of the flake powders connects to each other to form a connecting center, and the length of each of the flake powders is about 1.5 µm, as shown in FIG. 7A.

Next, the ferrous phosphate (II) powders doped with Mg of the present embodiment was used as a precursor, and mixed with $Li_3PO_4$ in a molar ratio of 1:1. In addition, 15 wt % of sugar was also added in the mixture. The mixture was mixed with a 3D shaker for 2 hrs to obtain mixed powders. Then, the mixed powders were heat-treated at 750° C., under an atmosphere of $N_2$ gas for 3 hrs. Finally, lithium iron phosphate powders coated with carbon and doped with Mg ($LiFe_{0.9}Mg_{0.1}PO_4$) and which were formed in flake shapes, were obtained.

Figure 7B:
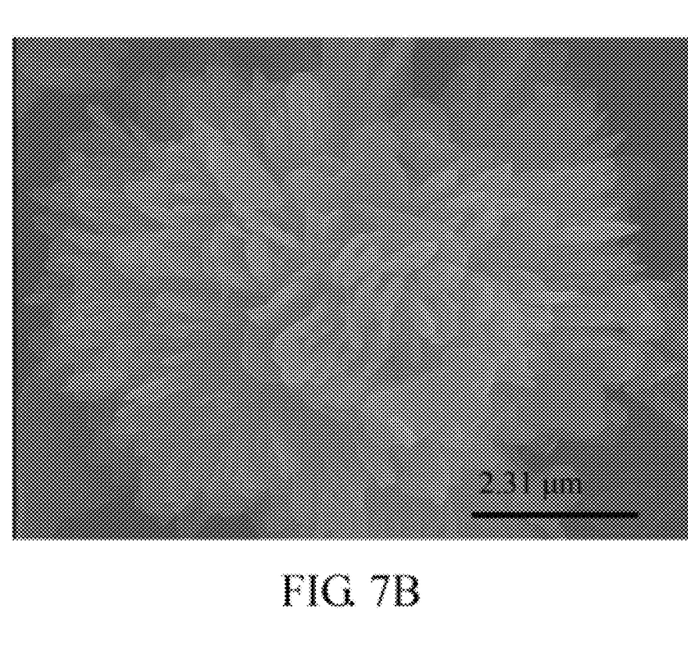
FIG. 7B is a SEM photo of lithium iron phosphate powders doped with Mg according to Embodiment 4 of the present invention.

The shapes of the lithium iron phosphate powders doped with Mg of the present embodiment were also observed with a scanning electron microscope (SEM) (Hitachi S-4000). The result shows that the lithium iron phosphate powders doped with Mg of the present embodiment have similar shape to that of ferrous phosphate (II) powders doped with Mg, and especially most of the powders are flake powders that one end of each of the flake powders connects to each other to form a connecting center, as shown in FIG. 7B.

Figure 8:
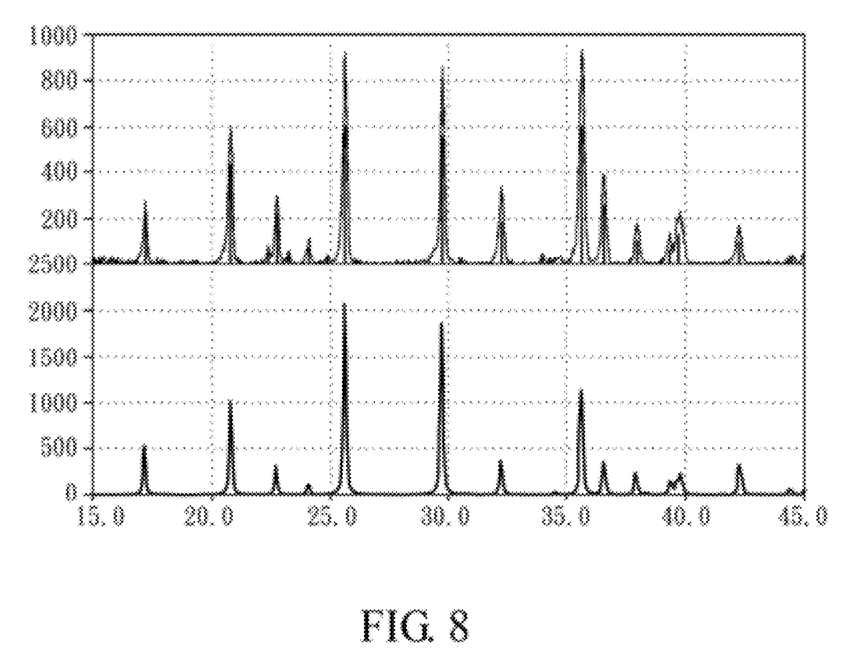
FIG. 8 is an XRD diffraction pattern of lithium iron phosphate powders doped with Mg according to Embodiment 4 of the present invention.

In addition, the obtained lithium iron phosphate powders doped with Mg of the present embodiment were also examined with an X-ray diffraction microscope (Shimadzu 6000) to obtain the crystal structure thereof. The X-ray diffraction pattern was collected by Cu Kα radiation, the 2θ-scanning angle is 15°-45°, and the scanning rate is 1°/min. The obtained XRD diffraction pattern is shown in FIG. 8, wherein the upper figure is the XRD diffraction pattern of lithium iron phosphate powders doped with Mg of the present embodiment, the lower figures are the XRD diffraction patterns of $LiFePO_4$ crystal with an olivine structure (JCPDS No. 81-1173), and lines in the upper figure are used to indicate the position of the peaks. The result indicates that all the lithium iron phosphate powders doped with Mg of the present embodiment have olivine structures.

Embodiment 5

$H_3PO_4$ and $NaHCO_3$ were mixed in a molar ratio of 1:3, and dissolved in de-ionized water (500 ml) to obtain a P-containing precursor solution. After the P-containing precursor solution was stirred for 30 mins, ferrous sulfate hydrate ($FeSO_4.8H_2O$), magnesium sulfate hydrate ($MgSO_4.6H_2O$), manganese sulfate hydrate ($MnSO_4.H_2O$), and nickel nitrate hydrate ($Ni(NO_3)_2.6H_2O$) were added into the P-containing precursor solution, wherein the molar ratio of $FeSO_4.8H_2O$: $MgSO_4.6H_2O$:$MnSO_4.H_2O$:$Ni(NO_3)_2.6H_2O$ was 7:1:1:1, and the molar ratio of the total amount of $FeSO_4.8H_2O$, $MgSO_4.6H_2O$, $MnSO_4.H_2O$, and $Ni(NO_3)_2.6H_2O$ to $H_3PO_4$ was 3:2. After the reaction was completed, the product was washed with an ethanol solution, and then collected with centrifugation twice. After the collected product was dried at 60° C. for 12 hours, ferrous phosphate (II) precursor powders doped with three kinds of metals ($Fe_{2.1}Mg_{0.3}Ni_{0.3}Mn_{0.3}(PO_4)_2.8H_2O$) were obtained.

Figure 9A:
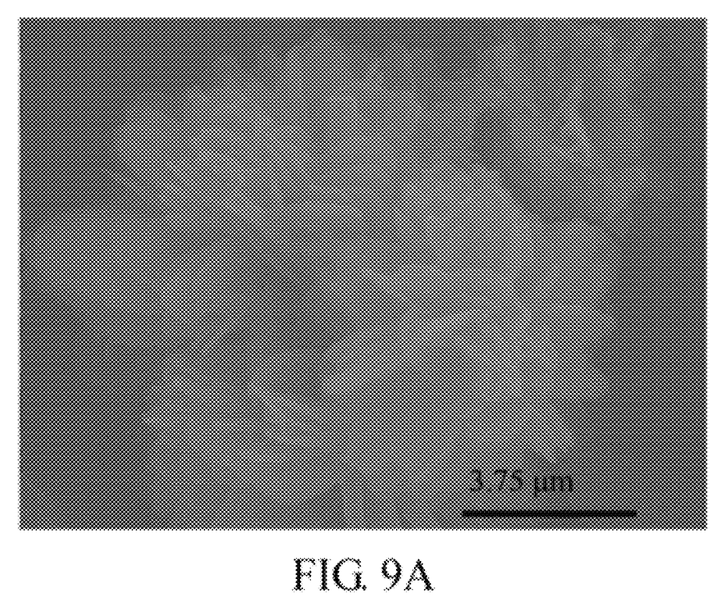
FIG. 9A is a SEM photo of ferrous phosphate (II) powders doped with three kinds of metals according to Embodiment 5 of the present invention.

The shapes of the ferrous phosphate (II) powders doped with three kinds of metals of the present embodiment were observed with a scanning electron microscope (SEM) (Hitachi S-4000). When the ferrous phosphate (II) powders doped with Mg, Ni, and Mn were observed at the magnification of 100000×, it was observed that the powders are composed of plural flake powders. More specifically, the powders are powders composed of independent flakes, flake powders that one end of each of the flake powders connects to each other to form a connecting center, or flake powders connecting to each other at the center of the flakes. Herein, most of the powders are flake powders that one end of each of the flake powders connects to each other to form a connecting center, and the length of each of the flake powders is about 1.5 µm, as shown in FIG. 9A.

Next, the ferrous phosphate (II) powders doped with Mg, Ni, and Mn of the present embodiment were used as a precursor, and mixed with $Li_3PO_4$ in a molar ratio of 1:1. In addition, 15 wt % of sugar was also added in the mixture. The mixture was mixed with a 3D shaker for 2 hrs to obtain mixed powders. Then, the mixed powders were heat-treated at 750° C., under an atmosphere of $N_2$ gas for 3 hrs. Finally, lithium iron phosphate powders coated with carbon and doped with Mg, Ni, and Mn ($LiFe_{0.7}Ni_{0.1}Mn_{0.1}Mg_{0.1}PO_4$) and which were formed in flake shapes, were obtained.

Figure 9B:
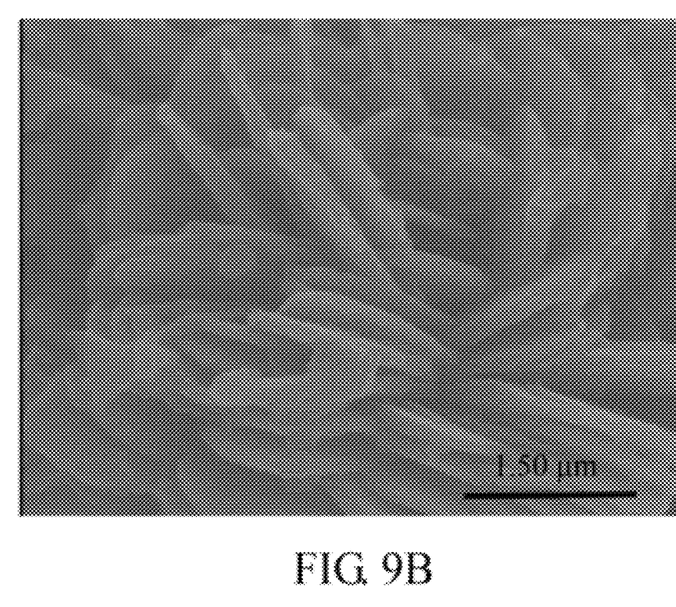
FIG. 9B is a SEM photo of lithium iron phosphate powders doped with three kinds of metals according to Embodiment 5 of the present invention.

The shapes of the lithium iron phosphate powders doped with Mg, Ni, and Mn of the present embodiment were also observed with a scanning electron microscope (SEM) (Hitachi S-4000). The result shows that the lithium iron phosphate powders doped with Mg, Ni, and Mn of the present embodiment have similar shape to that of ferrous phosphate (II) powders doped with Mg, Ni, and Mn, and especially most of the powders are flake powders that one end of each of the flake powders connects to each other to form a connecting center, as shown in FIG. 9B.

Figure 10:
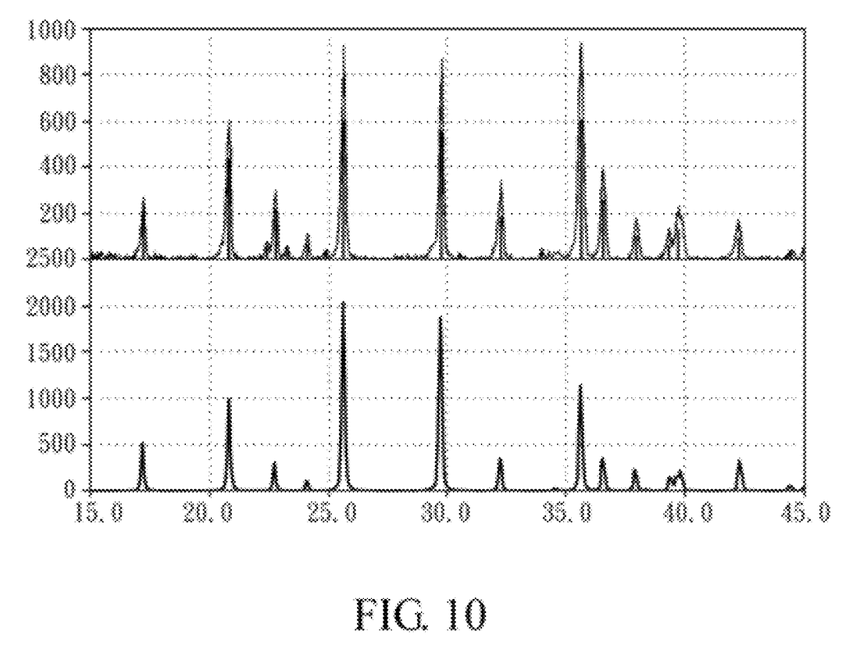
FIG. 10 is an XRD diffraction pattern of lithium iron phosphate powders doped with three kinds of metals according to Embodiment 5 of the present invention.

In addition, the obtained lithium iron phosphate powders doped with Mg, Ni, and Mn of the present embodiment were also examined with an X-ray diffraction microscope (Shimadzu 6000) to obtain the crystal structure thereof. The X-ray diffraction pattern was collected by Cu Kα radiation, the 2θ-scanning angle is 15°-45°, and the scanning rate is 1°/min. The obtained XRD diffraction pattern is shown in FIG. 10, wherein the upper figure is the XRD diffraction pattern of lithium iron phosphate powders doped with Mg, Ni, and Mn of the present embodiment, the lower figures are the XRD diffraction patterns of LiFePO$_4$ crystal with an olivine structure (JCPDS No. 81-1173), and lines in the upper figure are used to indicate the position of the peaks. The result indicates that all the lithium iron phosphate powders doped with Mg, Ni, and Mn of the present embodiment have olivine structures.

According to the results of Embodiments 1-5, the ferrous phosphate (II) powders have small and uniform grain size. When these ferrous phosphate (II) powders are used as a precursor for preparing lithium ion phosphate powders, the time for the heat-treating process can be shortened. Hence, the cost for manufacturing the Li-ion batteries can be further reduced. In addition, the sintered lithium ion phosphate powders have similar shape to that of ferrous phosphate (II) powders, so the sintered lithium ion phosphate powders also have small and uniform grain size. Hence, the grinding process and the sieving process can be omitted during the process for preparing the cathode materials, so the cost of Li-ion batteries can be reduced. Furthermore, the lithium iron phosphate powders of the present invention have nano, micro, or sub-micro grain size. When the lithium iron phosphate powders of the present invention are used as cathode materials of Li-ion batteries, the Li-ion batteries can exhibit uniform charging and discharging current, and excellent charge/discharge efficiency. Hence, not only the cost of the Li-ion batteries can be reduced, but also the charge/discharge time can be shortened and the capacity of the batteries can be further improved.

Although the present invention has been explained in relation to its preferred embodiment, it is to be understood that many other possible modifications and variations can be made without departing from the spirit and scope of the invention as hereinafter claimed.

What is claimed is:

1. Ferrous phosphate (II) powders for manufacturing a cathode material of a Li-ion battery, represented by the following formula (I):

$$Fe_{(3-x)}M_x(PO_4)_2 \cdot yH_2O \qquad (I)$$

wherein M comprises at least one metal selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb, $0 \leq x < 1.5$, y is an integer of 0 to 8, the ferrous phosphate (II) powders are composed of plural flake powders, the length of each of the flake powders is 0.5-10 µm, and the flake powders are powders composed of independent flakes, flake powders that one end of each of the flake powders connects to each other, flake powders connecting to each other at the center of the flakes, or flake powders that one end of each of the flake powders connects to each other to form a connecting center.

2. The ferrous phosphate (II) powders as claimed in claim 1, wherein one end of each of the flake powders connects to each other to form a connecting center.

3. The ferrous phosphate (II) powders as claimed in claim 1, wherein the metal is selected from the group consisting of Mn, Cr, Co, Cu, Ni, Zn, Al, and Mg.

4. The ferrous phosphate (II) powders as claimed in claim 1, wherein $0 \leq x < 0.5$.

5. The ferrous phosphate (II) powders as claimed in claim 1, wherein the length of each of the flake powders is 0.5-5 µm.

6. The ferrous phosphate (II) powders as claimed in claim 1, wherein the length of each of the flake powders is 0.5-2 µm.

* * * * *